United States Patent

[11] 3,607,933

| [72] | Inventor | Paul R. Stapp |
| | | Bartlesville, Okla. |
| [21] | Appl. No. | 771,345 |
| [22] | Filed | Oct. 28, 1968 |
| [45] | Patented | Sept. 21, 1971 |
| [73] | Assignee | Phillips Petroleum Company |

[54] PREPARATION OF OMEGA-HALOALKANOIC ACIDS
4 Claims, No Drawings

[52] U.S. Cl. .................................................. 260/539 R, 260/408, 260/539 A
[51] Int. Cl. .................................................. C07c 53/20, C07c 53/30
[50] Field of Search .................................. 260/539, 408

[56] References Cited
UNITED STATES PATENTS
3,172,875  3/1965  Chiusoli .................. 260/539 R FOREIGN PATENTS
1,074,026  7/1960  Germany ....................

OTHER REFERENCES
Reactions of Organic Compounds - Hickinbottom pp. 103, 104, pp. 281–282
Chemistry of Organic Compounds - Noller 1965; pp. 196–197

Primary Examiner—Lewis Gotts
Assistant Examiner—Jacqueline L. Davison
Attorney—Young and Quigg ABSTRACT: Omega-haloalkanoic acids are produced by the reaction of a hydrogen halide, water and an omega-cyanoalkyl carboxylate.

PREPARATION OF OMEGA-HALOALKANOIC ACIDS

BACKGROUND OF THE INVENTION

The omega-haloalkanoic acids of the formula $$X-(CR_2)_n-COOH$$

in addition to being useful as fungicides, bactericides and herbicides as well as plastifiers and as pharmaceutical materials as shown in German Pat. No. 1,074,026 also have been found useful in the formation of various polyamide or nylon type compounds including those having alkyl side chains contained therein. Thus by preparing the intermediate lactam from the omega-haloalkanoic acid there can be obtained an alkyl substituted lactam which, when reacted in accordance with a conventional nylon forming process, results in alkyl substituted type nylon polymers.

Because of the highly competitive nature of the textile industry in general much effort has been devoted to finding means for reducing the overall cost of operation in the formation of various nylons. Accordingly, any system which will result in the reduction of the cost of the formation of either the ultimately desired fibers or any intermediate to the production of same represents a significant and certainly an economically attractive contribution to the art.

It is thus an object of the present invention to provide an improved process for the formation of compounds which can be utilized in the formation of polyamide fibers.

Another object of the present invention is to provide a novel process for the production of omega-haloalkanoic acids.

Other aspects, objects and the several advantages of this invention will be apparent from the following specification and claims.

In accordance with the present invention, I have discovered that omega-haloalkanoic acids can be readily produced by the reaction of a hydrogen halide, water and an omega-cyanoalkyl carboxylate.

The omega-cyanoalkyl carboxylates which were useful in the process of this invention are those compounds of the formula

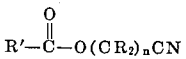

wherein R' is H, or alkyl, cycloalkyl, aryl, or combinations thereof, such as alkaryl, aralkyl and the like having 1 to 8 carbon atoms inclusive per R' group; R is H or alkyl, having from 1 to 4 carbon atoms inclusive per alkyl group, per molecule; and wherein n is an integer in the range of 1 to 10. The omega-cyanoalkyl carboxylates can have a total carbon atom content of 3 to 28 carbon atoms per molecule.

The omega-cyanoalkyl carboxylates are formed by the reaction of respective omega-haloalkyl carboxylates and alkali metal cyanides.

Examples of such omega-cyanoalkyl carboxylates which are useful in accordance with the present invention include 5-cyanopentyl methanecarboxylate (5-cyanopentyl acetate)
1-cyanomethyl formate
10-cyanodecyl octanecarboxylate
10-cyano-2,4-dibutyldecyl benzoate
10-cyano-2-methyl-4-propyl-6,7-diethyldecyl cyclooctanecarboxylate
10-cyano-2,3,4,5-tetraethyldecyl cyclopentanecarboxylate
8-cyanooctyl benzylacarboxylate
7-cyanoheptyl 2,6-xylylcarboxylate
5-cyanopentyl 2-methylbutane carboxylate
5-cyanopentyl propanecarboxylate
6-cyanohexyl formate and the like.

The omega-haloalkanoic acids produced by the process of the present invention are those of the formula

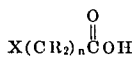

wherein X is a halogen-chlorine, bromine, iodine or fluorine. R is H or an alkyl group containing from 1 to 4 carbon atoms therein and n is an integer from 1 to 10.

Examples of such compounds include 6-chlorohexanoic acid
11-chloroundecanoic acid
2-chloroacetic acid
5-dibutylpentanoic acid
11-fluoro-2,3,4,5-tetraethylundecanoic acid
11-iodo-2,4,6,7-tetramethylundecanoic acid
8-chloro-2,3-diethyl-3-propyloctanoic acid
7-bromo-2,2,4,4-tetraethylheptanoic acid
6-bromohexanoic acid
5-fluoropentanoic acid
7-iodeheptanoic acid
4-chlorobutanoic acid and the like.

According to the process of this invention, temperatures in the range of 10° to 150° C. can be employed, preferably a temperature in the range of 50° to 130° C.

Pressures can be in the range of about 0.5 to 10 atmospheres. Atmospheric pressure is often employed because of convenience.

Reaction times should be of sufficient duration to permit the obtaining of adequate conversion of the reactants. Normally, reaction times in the range of about 5 minutes to 48 hours are suitable.

If desired a diluent can be utilized in carrying out the reaction. In general any composition which is not reactive with the reactants or the products under the reaction environment can be employed as a diluent in amounts constituting as much as 95 weight percent of the reaction medium. Examples of suitable diluents include hexane, benzene, cyclododecane, tetrahydropyran, tetrahydrofuran and the like.

Generally at least about 1 mole of hydrogen halide and 2 moles of water are employed per mole of omega-cyanocarboxylate, though smaller quantities can be employed if desired. Preferably, an excess of hydrogen halide and water over the equivalent amounts is employed in the range of 2 to 200 moles of water and 1 to 100 moles of hydrogen halide per mole of omega-cyanocarboxylate, though even greater quantities of water and hydrogen halide can be employed if desired.

The following examples are presented to further illustrate the invention.

EXAMPLE I

PREPARATION OF 5-Cyanopentyl Acetate

Under a nitrogen atmosphere, a stirred reactor was charged with 258 g. (3.2 ml., 3.0 moles) of tetrahydropyran and 25 g. of anhydrous zinc chloride. After the zinc chloride had gone into solution, 149 g. (145 ml., 5.0 moles) of acetyl chloride was added. The resulting mixture was refluxed with stirring for 6 hours. The reaction mixture was treated with 300 ml. of water, and the phases were subsequently separated. The organic phase was washed with water and dried over magnesium sulfate. Volatiles were stripped. A yield of 266.8 g. of 5-chloropentyl acetate was recovered by distillation effecting a yield of 81.3 mol percent based on the tetrahydropyran charged. Elemental composition calculated for 5-chloropentyl acetate is: C, 51.2; H, 7.9; Cl, 21.6. Elemental composition found for the product was: C, 51.5; H, 8.5; Cl, 20.7.

To a stirred reactor were charged 195 g. (3.0 moles) of potassium cyanide and 1 liter of dimethylformamide. A total of 205.6 g. (1.25 moles) of the 5-chloropentyl acetate (1-acetoxy-5-chloropentane) which was prepared above was added, and the mixture was refluxed with stirring for 12 hours. Upon cooling, the reaction mixture was poured into 2 liters of water and this was extracted with ether. The combined ether extracts were dried over magnesium sulfate and the ether was stripped. Fractional distillation yielded 136 g. of 5-cyanopentyl acetate which constituted a yield of 70 mole percent based on the 5-chloropentyl acetate charged. Elemental composition calculated for 5-cyanopentyl acetate is: C, 62.0; H, 8.4; N, 9.0. Elemental composition found for the product was: C, 62.0; H, 9.0; N, 9.2.

EXAMPLE II

Preparation of 6-Chlorohexanoic Acid

To a stirred reactor was charged 22 g. (0.142 moles) of 5-cyanopentyl acetate (1-acetoxy-5-cyanopentane) which was prepared in Example I. A total of 150 ml. of concentrated HCl was added and the mixture was refluxed for 6 hours. Upon cooling, the reaction mixture was diluted with water and the product was extracted with methylene chloride. The methylene chloride extract was washed with water and dried over magnesium sulfate. The methylene chloride was removed on a rotary evaporator. The residue was fractionally distilled to yield 17.1 g. of 6-chlorohexanoic acid having a boiling point of 96°–100° C. at a pressure of 0.5 mm. Hg.

Reasonable variations and modifications of this invention can be made, or followed, in view of the foregoing disclosure, without departing from the spirit or scope thereof.

I claim:

1. A process for the production of omega-haloalkanoic acids of the formula

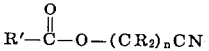

which comprises reacting an omega-cyanoalkyl carboxylate of the formula $$R'-\overset{O}{\underset{\|}{C}}-O-(CR_2)_nCN$$

wherein X is halogen, R' is hydrogen or an alkyl, cycloalkyl or aryl radical or combinations thereof having from 1 to 8 carbon atoms therein; n is an integer of 1 to 10; R is hydrogen or an alkyl radical having from 1 to 4 carbon atoms therein with a hydrogen halide and water and thereafter recovering the resulting omega-haloalkanoic acid as a product of the process.

2. The process according to claim 1 wherein said hydrogen halide is hydrogen chloride.

3. A process according to claim 2, wherein the temperature is in the range of 50° to 130° C., the pressure is in the range of 0.5 to 10 atmospheres and the reaction time is in the range of 5 minutes to 48 hours.

4. A process according to claim 3, wherein said omega-cyanoalkyl carboxylate is 5-cyanopentylacetate.